United States Patent [19]

Testa

[11] Patent Number: 5,557,875
[45] Date of Patent: Sep. 24, 1996

[54] BUTT ASSEMBLY FOR A FISHING POLE

[76] Inventor: Thomas Testa, 36 Sunnyfield Dr., Windsor, Conn. 06095

[21] Appl. No.: 347,577

[22] Filed: Nov. 30, 1994

[51] Int. Cl.⁶ .................................................. A01K 87/06
[52] U.S. Cl. ...................................... 43/20; 43/22; 43/23
[58] Field of Search ................................. 43/20, 22, 23, 43/21; 242/316, 323; 248/219.4, 230.1, 230.5

[56] References Cited

U.S. PATENT DOCUMENTS

| | | | |
|---|---|---|---|
| D. 116,927 | 10/1939 | Wilson | 43/22 |
| D. 135,761 | 6/1943 | Fanshier | 43/20 |
| 2,198,856 | 4/1940 | Bowman | 43/20 |
| 2,495,980 | 1/1950 | Meierjohan | 43/22 |
| 3,077,318 | 2/1963 | Du Val | 242/323 X |
| 3,531,888 | 10/1970 | Wells et al. | 43/23 |
| 4,083,141 | 4/1978 | Shedd et al. | 43/23 X |
| 4,637,157 | 1/1987 | Collins | 43/23 X |
| 5,012,607 | 5/1991 | Meschkat | 43/25 |
| 5,377,441 | 1/1995 | Noda | 43/22 |

*Primary Examiner*—J. Elpel
*Attorney, Agent, or Firm*—Fishman, Dionne & Cantor

[57] ABSTRACT

A butt assembly for a fishing pole comprises a generally cylindrical elongated member having a male rotary connection at the upper end thereof for connection to a female connecting sleeve of a fishing rod. The upper end of the butt is keyed for aligning the rod when connected to the butt. The lower end of the butt includes cross shaped notches for being received in a gimbal which prohibits twisting while allowing a back and forth movement. A segment is defined in the butt near the upper end thereof for receiving a reel housing. The segment is located at a distance from the upper end of the butt, i.e., the end where the rod is attached, for positioning the reel housing as is conventional in the industry. The segment is an arcuate segment having a contour for closely matching the profile of the reel housing positioned therein. The reel housing is secured within the segment by a reel block. The reel block is disposed on the butt at the opposite side from the segment and secured to the reel housing by posts. The reel block also includes a longitudinal arcuate groove which receives the outer surface of the butt. The butt has a longitudinal center axis and the reel housing has a longitudinal center axis, whereby the distance between these axis is determined by the manner in which the reel housing is secured to the butt. The distance between these axis is substantially less than that of the prior art, whereby the so-called "flip-flop" or "twist" of the reel housing when reeling in a fish is significantly reduced as compared to the prior art.

17 Claims, 4 Drawing Sheets

5,557,875

BUTT ASSEMBLY FOR A FISHING POLE

BACKGROUND OF THE INVENTION

The present invention relates to butts for fishing poles. More specifically, the present invention relates to a novel butt assembly for fishing poles having a segment for receiving a reel housing.

Butts for fishing poles are well known. Typically, a butt comprises a generally cylindrical elongated member having a male rotary connection at the upper end thereof for connection to a female connecting sleeve of a fishing rod. The upper end of the butt is keyed for aligning the rod when connected to the butt. A pair of collars are disposed on the butt. The upper collar slides freely on the butt between a pair of ring nuts and the lower collar, which is secured at a fixed position on the butt. The ring nuts are disposed on the rotary connection with the upper ring nut being a locking ring nut. The lower end of the butt includes cross shaped notches for being received in a gimbal which prohibits twisting while allowing a back and forth movement.

A reel foot is secured to a reel housing by screws or the like, as is well known. The reel housing via the foot is then secured on the butt by the collars. More specifically, tabs on the foot are received in slots in the collars, and upper collar is held against the foot and the lower collar by the collar nuts. The foot further includes a longitudinal arcuate groove which receives the outer surface of the butt. The reel housing is further secured on the butt by a reel block. The reel block is disposed on the butt at the opposite side from the foot and secured to the reel housing by posts. The reel block also includes a longitudinal arcuate groove which receives the outer surface of the butt.

The butt has a longitudinal center axis and reel housing has a longitudinal center axis. The distance between these axis is determined by the manner in which the reel housing is secured to the butt. The above-described attachment results in a distance between the axis which results so-called "flip-flop" or "twist" of the reel housing when reeling in a fish.

SUMMARY OF THE INVENTION

The above-discussed and other drawbacks and deficiencies of the prior art are overcome or alleviated by the butt assembly for a fishing pole of the present invention. In accordance with the present invention, the butt comprises a generally cylindrical elongated member having a male rotary connection at the upper end thereof for connection to a female connecting sleeve of a fishing rod. The upper end of the butt is keyed for aligning the rod when connected to the butt, as is well known. The lower end of the butt includes cross shaped notches for being received in a gimbal which prohibits twisting while allowing a back and forth movement, as is well known.

A segment is defined in the butt near the upper end thereof for receiving a reel housing. The segment is located at a distance from the upper end of the butt, i.e., the end where the rod is attached, for positioning the reel housing as is conventional in the industry. The segment is an arcuate segment having a contour for closely matching the profile of the reel housing positioned therein. The reel housing is secured within the segment by a reel block. The reel block is disposed on the butt at the opposite side from the segment and secured to the reel housing by posts. The reel block also includes a longitudinal arcuate groove which receives the outer surface of the butt.

The butt has a longitudinal center axis and the reel housing has a longitudinal center axis, whereby the distance between these axis is determined by the manner in which the reel housing is secured to the butt. The distance between these axis is substantially less than that of the prior art, whereby the so-called "flip-flop" or "twist" of the reel housing when reeling in a fish is significantly reduced as compared to the prior art.

In accordance with an alternate embodiment of the present invention, the lower portion of the butt comprises an inward stepped cylindrical portion having a padding material, e.g., cork or EVA (ethyl vinyl acetate), disposed thereabout except for the lower end thereof. A gimbal attachment is connected at the end of the lower portion.

In accordance with still another alternate embodiment of the present invention, the lower portion of the butt comprises a fiberglass shaft which is secured in a recess at the lower end of the upper portion of the butt. A padding material, e.g., cork or EVA (ethyl vinyl acetate), is disposed about the shaft except for the lower end thereof. A gimbal attachment is connected at the end of the shaft.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
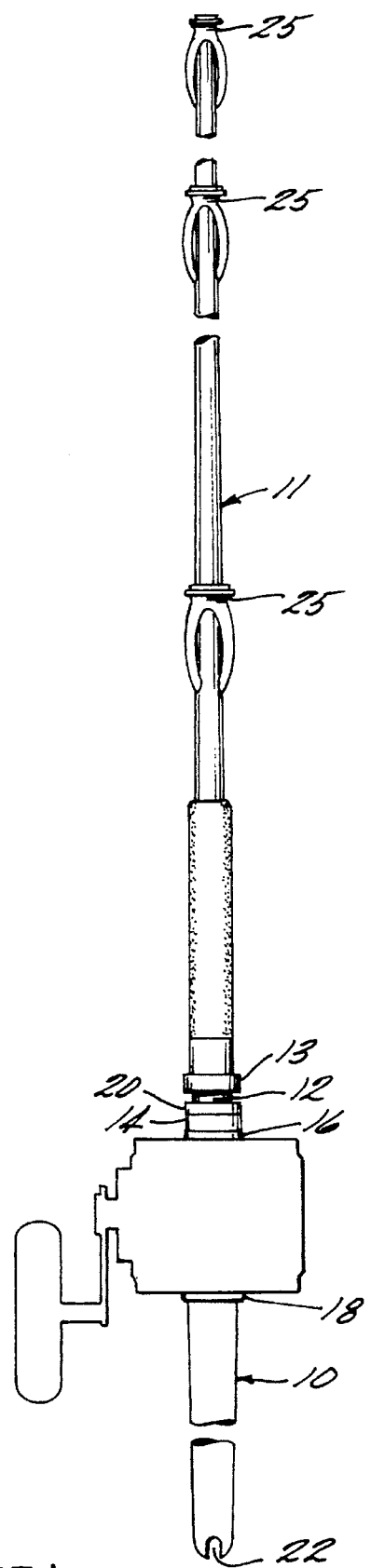
FIG. 1 is a front view of a fishing pole in accordance with the prior art.
Figure 2:
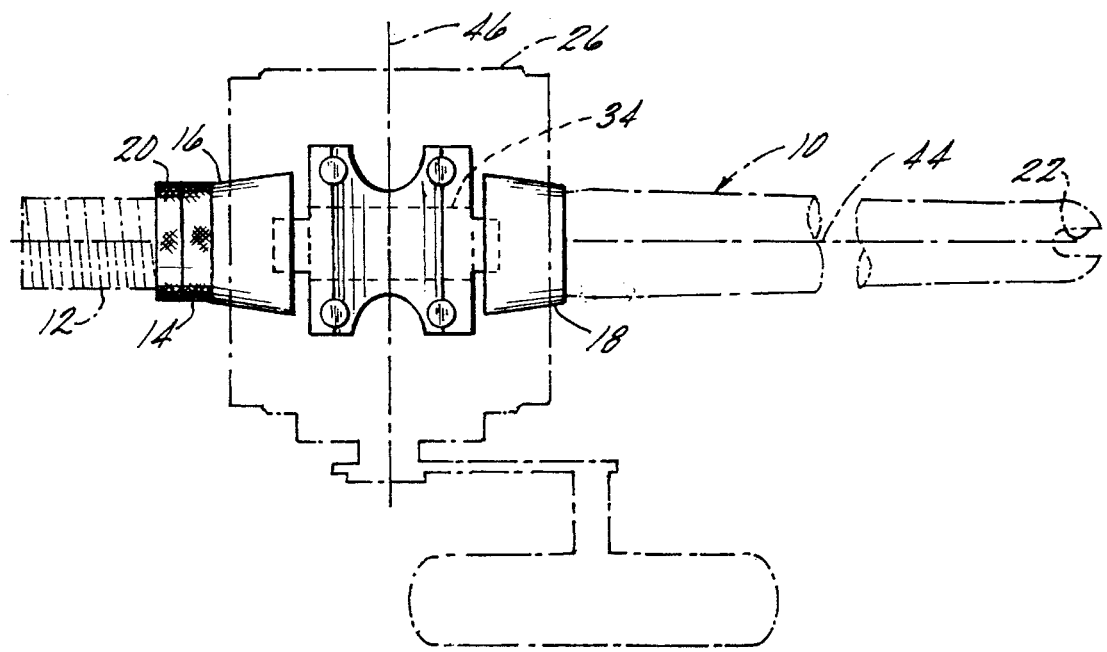
FIG. 2 is a front view of the butt and reel housing of the fishing pole of FIG. 1 with portions thereof shown in phantom.
Figure 3:
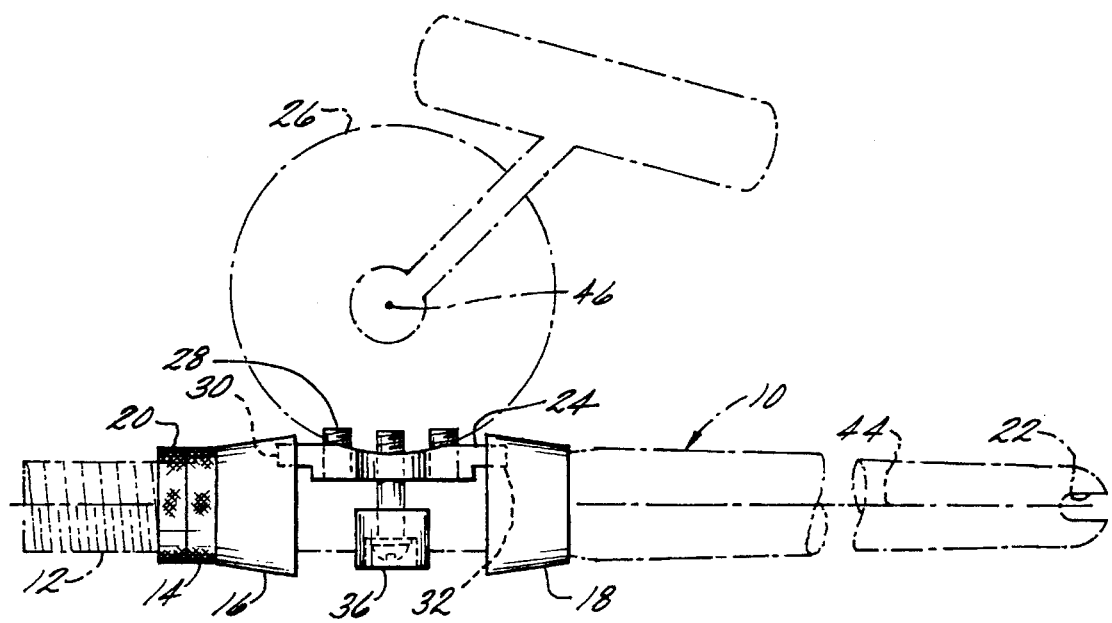
FIG. 3 is a side elevation view of the butt and reel housing of the fishing pole of FIG. 1 with portions thereof shown in phantom.
Figure 4:
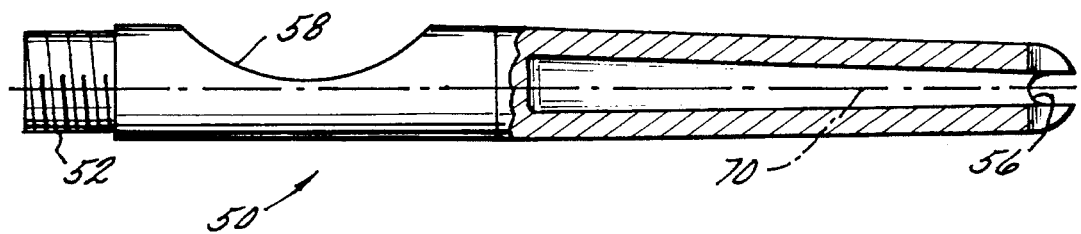
FIG. 4 is a side elevation view of a butt partially in cross section in accordance with the present invention.
Figure 5:
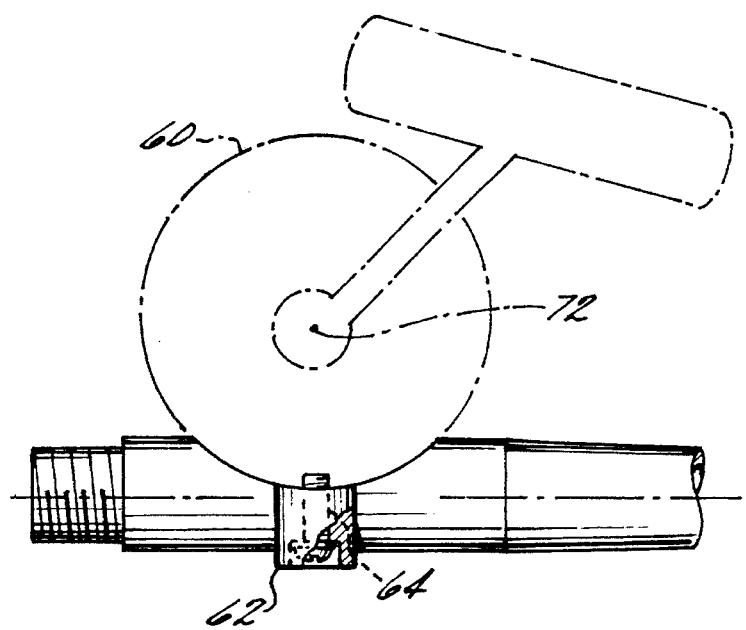
FIG. 5 is a side elevation view of the butt of FIG. 4 with a reel housing attached thereto in accordance with the present invention.
Figure 6:
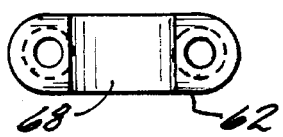
FIG. 6 is front view of the reel block shown in FIG. 5.
Figure 7:
FIG. 7 is an end view of the reel block shown in FIG. 5.

Referring to FIGS. 1–3, a butt in accordance with the prior art is shown generally at 10. Butt 10 comprises a generally cylindrical elongated member having a male rotary connection 12 at the upper end thereof for connection to a female connecting sleeve of a fishing rod 11 by a collet nut 13. The upper end of butt 10 is keyed for aligning the rod when connected to the butt, as is well known. A pair of collars 16 and 18 are disposed on the butt. Upper collar 16 slides freely on butt 10 between a pair of ring nuts 14, 20 and lower collar 18, which is secured at a fixed position on the butt. Ring nuts 14, 20 are disposed on rotary connection 12 with ring nut 20 being a locking ring nut, as is well known. The lower end of the butt includes cross shaped notches 22 for being received in a gimbal (not shown) which prohibits twisting while allowing a back and forth movement, as is well known.

A reel foot 24 is secured to a reel housing 26 by screws 28 or the like, as is well known. Reel housing 26 is receptive to a reel assembly which includes a line which is guided along rod 11 by a plurality of eyelets 25 mounted to rod 11. Reel housing 26 via foot 24 is then secured on butt 10 by collars 16 and 18. More specifically tabs 30 and 32 on foot 24 are received in slots in collars 16 and 18, and collar 16 is held against foot 24 and collar 18 by collar nuts 14 and 20, again as is well known. Foot 24 further includes a longitudinal arcuate groove 34 which receives the outer surface of butt 10. Reel housing 26 is further secured on butt 10 by a reel block 36. Reel block 36 is disposed on butt 10 at the opposite side from foot 24 and secured to reel housing 26 by posts 38. Reel block 36 also includes a longitudinal arcuate groove which receives the outer surface of butt 10.

Butt 10 has a longitudinal center axis 44 and reel housing 26 has a longitudinal center axis 46. The distance between axis 44 and 46 is determined by the manner in which reel housing 26 is secured to butt 10. The above-described prior art results in a distance between axis 44 and 46 which results so-called "flip-flop" or "twist" of the reel housing when reeling in a fish.

Referring to FIGS. 4–7, a butt in accordance with the present invention is shown generally at 50. Butt 50 comprises a generally cylindrical elongated member having a male rotary connection 52 at the upper end thereof for connection to a female connecting sleeve of a fishing rod (such as is shown in FIG. 1). The upper end of butt 50 is keyed for aligning the rod when connected to the butt, as is well known. The lower end of the butt includes cross shaped notches 56 for being received in a gimbal (not shown) which prohibits twisting while allowing a back and forth movement, as is well known.

A segment 58 is defined in butt 50 near the upper end thereof for receiving a reel housing 60. Reel housing 60 is receptive to a reel assembly which includes a line which is guided along the rod by a plurality of eyelets mounted thereto. Segment 58 is located at a distance from the upper end of butt 50, i.e., the end where the rod is attached, for positioning reel housing 60 as is conventional in the industry. Segment 58 is an arcuate segment having a contour for closely matching the profile of the reel housing positioned therein. It will be appreciated that segment 58 may comprises any contour which closely matches the profile of the reel housing positioned therein. Reel housing 60 is secured within segment 58 on butt 50 by a reel block 62. Reel block 62 is disposed on butt 50 at the opposite side from segment 58 and secured to reel housing 60 by posts 64. Reel block 62 also includes a longitudinal arcuate groove 68 which receives the outer surface of butt 50. Reel block 62 is the same as the prior art reel block 36 discussed above. Butt 50 is preferably comprised of a single elongated cylindrical piece of a light weight metal, e.g., aluminum, with the upper portion of butt, 50 where segment 58 is defined, being solid and the lower portion of butt 50 being hollowed out to reduce weight.

Butt 50 has a longitudinal center axis 70 and reel housing 60 has a longitudinal center axis 72. Again the distance between axis 70 and 72 is determined by the manner in which reel housing 60 is secured to butt 50. In accordance with an important feature of the present invention the distance between axis 70 and 72 is substantially less that the distance between axis 44 and 46 of the above-described prior art, whereby the so-called "flip-flop" or "twist" of the reel housing when reeling in a fish is significantly reduced as compared to the prior art.

Figure 8:
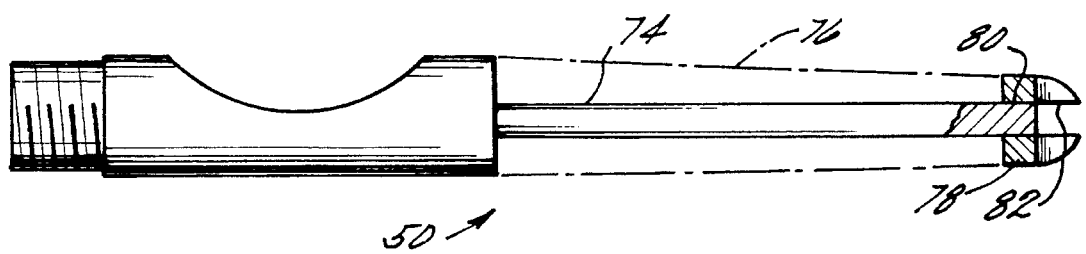
FIG. 8 is a side elevation view of a butt partially in cross section in accordance with an alternate embodiment of the present invention.

Referring to FIG. 8, in accordance with an alternate embodiment of the present invention, the lower portion of butt 50 comprises an inward stepped cylindrical portion (or extension) 74. The upper portion of butt 50 is the same as in the embodiment of FIGS. 4–7, however when butt 50 is not a single unit as described above, the upper portion is commonly referred to in the industry as a reel blank. As in the above embodiment the upper and lower portions of butt 50 are preferably comprised of a single piece of a light weight material, e.g., a light weight metal such as aluminum, with both the upper and lower portions of butt 50 being solid. A padding material 76, e.g., cork or EVA (ethyl vinyl acetate), is disposed about lower portion 74 except for the lower end thereof. A cylindrical member 78 has a recess 80 at one end thereof and cross shaped notches 82 at the other end thereof for being received in a gimbal (not shown) which prohibits twisting while allowing a back and forth movement, as is well known. The lower end of portion 74 is epoxied in recess 80, so that butt 50 is properly aligned when disposed in the gimbal. This attachment of member 78 to portion 74 may also be accomplished by means of a timed rotary connection as is well known or other suitable means.

Figure 9:
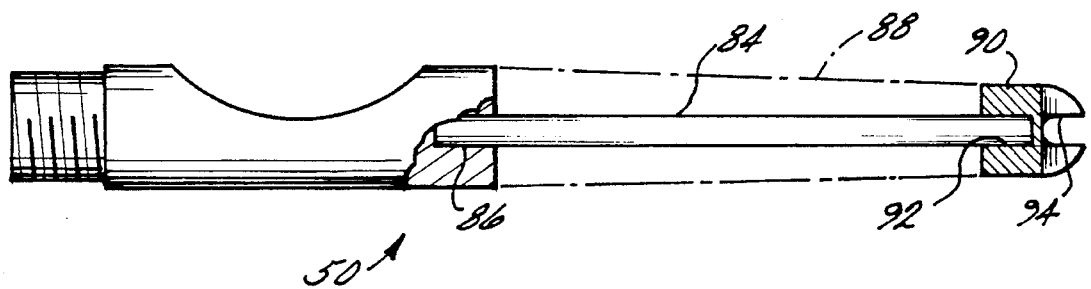
FIG. 9 is a side elevation view of a butt partially in cross section in accordance with still another alternate embodiment of the present invention.

Referring to FIG. 9, in accordance with still another alternate embodiment of the present invention, the lower portion of butt 50 comprises a shaft 84 which is secured in a recess 86 at the lower end of the upper portion of butt 50 by a suitable epoxy. The upper portion of butt 50 is the same as in the embodiment of FIGS. 4–7, however when butt 50 is not a single unit as described above, the upper portion is commonly referred to in the industry as a reel blank. Shaft 84 is preferably comprised of fiberglass or other suitable material having comparable flexibility. As in the above embodiment, the upper portion of butt 50 is preferably comprised of a single solid piece of a light weight metal, e.g., aluminum. A padding material 88, e.g., cork or EVA (ethyl vinyl acetate), is disposed about shaft 84 except for the lower end thereof. A cylindrical member 90 has a recess 92 at one end thereof and cross shaped notches 94 at the other end thereof for being received in a gimbal (not shown) which prohibits twisting while allowing a back and forth movement, as is well known. The lower end of shaft 84 is epoxied in recess 92, so that butt 50 is properly aligned when disposed in the gimbal.

It will be appreciated that present invention has fewer components than the prior art and is quicker and more easily assembled. Further, the present invention provides a sleeker, more integrated appearance than the prior art, which is believed to be more desirable.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A butt for attachment to a reel housing and a fishing rod, said butt comprising:

a generally cylindrical elongated member having opposing upper and lower ends, said upper end including means for connecting to a fishing rod;

a generally arcuate segment formed in said member for receiving a reel housing;

a reel block disposed on said member opposite said segment, said reel block to be connected to the reel housing for retaining the reel housing on said member within said segment.

2. The butt of claim 1 wherein said lower end of said member includes means for securing said member in a gimbal.

3. The butt of claim 1 wherein said means for connecting to a fishing rod comprises a rotary connection.

4. The butt of claim 1 wherein said segment is formed in said member at an upper portion thereof, said upper portion being solid.

5. The butt of claim 4 wherein said member includes a lower portion, said lower portion being hollow.

6. The butt of claim 4 wherein said member includes a lower portion, said lower portion comprising:

an inward stepped cylindrical extension; and a padding material disposed about said extension.

7. The butt of claim 6 wherein said lower portion further comprises means for securing said member in a gimbal disposed at one end of said extension.

8. The butt of claim 4 wherein said member includes a lower portion, said lower portion comprising:

a shaft connected at one end thereof to said upper portion; and a padding material disposed about said shaft.

9. The butt of claim 8 wherein said lower portion further comprises means for securing said member in a gimbal disposed at another end of said shaft.

10. A fishing pole assembly comprising:

a fishing rod;

a reel housing;

a butt comprising (1) a generally cylindrical elongated member having opposing upper and lower ends, said fishing rod connected to said upper end and (2) a generally arcuate segment formed in said member, said reel housing disposed in said segment;

a reel block disposed on said member opposite said segment; and means for connecting said reel block to said reel housing, wherein said reel housing is secured in said segment.

11. The assembly of claim 10 wherein said lower end of said member includes means for securing said member in a gimbal.

12. The assembly of claim 10 wherein said segment is formed in said member at an upper portion thereof, said upper portion being solid.

13. The assembly of claim 12 wherein said member includes a lower portion, said lower portion being hollow.

14. The assembly of claim 12 wherein said member includes a lower portion, said lower portion comprising:

an inward stepped cylindrical extension; and a padding material disposed about said extension.

15. The assembly of claim 14 wherein said lower portion further comprises means for securing said member in a gimbal disposed at one end of said extension.

16. The assembly of claim 12 wherein said member includes a lower portion, said lower portion comprising:

a shaft connected at one end thereof to said upper portion; and a padding material disposed about said shaft.

17. The assembly of claim 16 wherein said lower portion further comprises means for securing said member in a gimbal disposed at another end of said shaft.

* * * * *